(12) United States Patent
Ho et al.

(10) Patent No.: US 11,549,761 B1
(45) Date of Patent: Jan. 10, 2023

(54) RADIAL PARTICLE-BASED TERRESTRIAL THERMOCLINE FOR HIGH TEMPERATURE THERMAL STORAGE

(71) Applicant: National Technology & Engineering Solutions of Sandia, LLC, Albuquerque, NM (US)

(72) Inventors: Clifford K. Ho, Albuquerque, NM (US); Paul Gauche, Albuquerque, NM (US); Hendrik F. Laubscher, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 28 days.

(21) Appl. No.: 17/023,550

(22) Filed: Sep. 17, 2020

(51) Int. Cl.
*F28D 20/00* (2006.01)

(52) U.S. Cl.
CPC .. *F28D 20/0052* (2013.01); *F28D 2020/0021* (2013.01); *F28D 2020/0082* (2013.01)

(58) Field of Classification Search
CPC ......... F28D 20/0052; F28D 2020/0082; F28D 2020/0021; F28D 20/0056; F28D 2020/006; F24D 11/0214; F24T 10/17
USPC .......................................................... 165/10
See application file for complete search history.

(56) References Cited

U.S. PATENT DOCUMENTS

| | | | | |
|---|---|---|---|---|
| 4,326,818 A * | 4/1982 | Willis | ...................... | E03B 11/14 405/266 |
| 5,178,491 A * | 1/1993 | Graves | .................. | E21B 43/121 435/243 |
| 9,011,689 B1 * | 4/2015 | Czarnecki | ................. | C02F 3/32 210/170.03 |
| 9,085,412 B1 * | 7/2015 | Sasakura | ............. | F28D 20/0052 |
| 10,288,221 B2 * | 5/2019 | Donelick | ................. | F03D 9/28 |
| 10,336,544 B2 * | 7/2019 | Fabbri | ..................... | E03B 11/14 |
| 10,597,231 B2 * | 3/2020 | Fabbri | ....................... | E03B 3/34 |
| 2005/0173124 A1 * | 8/2005 | McDonald | ........... | B01D 5/0081 166/369 |

(Continued)

FOREIGN PATENT DOCUMENTS

| | | |
|---|---|---|
| WO | 2014174384 A1 | 10/2014 |
| WO | 2019211786 A1 | 11/2019 |

OTHER PUBLICATIONS

Schlumberger—Sliding sleep separation tool—Mar. 31, 2012.*

(Continued)

*Primary Examiner* — Jon T. Schermerhorn, Jr.
(74) *Attorney, Agent, or Firm* — Daniel J. Jenkins

(57) ABSTRACT

A system or method for thermal storage includes a recess or containment unit having a first storage layer and a second storage layer comprising a permeable filler material. An intermediate layer is disposed between the storage layers. A primary well traverses the layer in the recess. The primary well is in thermal communication with the first permeable filler material and the second permeable filler material. A heat source is provided for heating an inlet fluid. An input pump is in fluid communication with the primary well and the heat source. The primary well receives heated inlet fluid from the inlet pump and injects the fluid into the second layers. The heated inlet fluid transfers heat to the respective permeable filler material radially from the primary well toward an outer periphery of the thermocline recess.

19 Claims, 3 Drawing Sheets

(56) References Cited

U.S. PATENT DOCUMENTS

| | | | | |
|---|---|---|---|---|
| 2011/0127004 A1* | 6/2011 | Freund | F02C 6/16 | 165/45 |
| 2011/0168159 A1* | 7/2011 | Lataperez | F24D 11/00 | 126/400 |
| 2017/0082380 A1* | 3/2017 | Gauché | F28F 21/08 | |
| 2018/0179955 A1* | 6/2018 | Apte | F02C 1/10 | |
| 2018/0347913 A1* | 12/2018 | Mungas | F28D 20/023 | |

OTHER PUBLICATIONS

Janiszewski et al.—Hydraulically fractured hard rock aquifer for seasonal storage of solar thermal energy—May 15, 2018.*

Bradshaw, R.W. and D.E. Meeker, High-Temperature Stability of Ternary Nitrate Molten-Salts for Solar Thermal-Energy Systems, Solar Energy Materials, 1990, p. 51-60,21(1), Nethedands.

Gil, A., M. Medrano, I. Martorell, A. Lazaro, P. Dolada, B. Zalba, and L.F. Cabeza, State of the art on high temperature thermal energy storage for power generation. Part 1—Concepts, materials and modellization, Renewable & Sustainable Energy Reviews, 2010, p. 31-55, 14(1), United States.

Yang, Z., and S. V. Garimella, Molten-salt thermal energy storage in thermoclines under different environmental boundary conditions, Applied Energy, 2010, p. 3322-3329, 87(11), England.

Siegel, Nathan P., Thermal energy storage for solar power production, Wiley Interdisciplinary Reviews—Energy and Environment, 2012, p. 119-131, 1(2), United States.

Flueckiger, S. M., Z. Yang, and S. V. Garimella, Thermomechanical Simulation of the Solar One Thermocline Storage Tank, Journal of Solar Energy Engineering—Transactions of the Asme, 2012, p. 041014-1 to 041014-6, 134(4), United States.

Zanganeh, G., A. Pedretti, S. A. Zavattoni, M. C. Barbato, A. Haselbacher, A. Steinfeld, Design of a 100 MWh(th) packed-bed thermal energy storage, Energy Procedia, 2014, p. 1071-1077, 49, Amsterdam.

Zanganeh, G. A., A. Haselbacher, and A. Steinfeld, Design of packed bed thermal energy storage systems for high-temperature industrial process heat, Applied Energy, 2015, p. 812-822, 137(C), England.

Zavattoni, S. A., M. C. Barbato, A. Pedretti, and G. Zanganeh, Single-tank TES system—Transient evaluation of thermal stratification according to the second-law of thermodynamics, Energy Procedia, 2015, p. 1068-1077, 69, Amsterdam.

Branz, H. M., W. Regan, K. J. Gerst, J. B. Borak, and E. A. Santori, Hybrid solar converters for maximum exergy and inexpensive dispatchable electricity, Energy & Environmental Science, 2015, p. 3083-3091, 8(11), England.

Laubscher, Hendrik Frederik, Theodor Willem Von Backstom, and Frank Dinter, Developing a cost effective rock bed thermal energy storage system: Design and modelling, AIP Conference Proceedings, 2017, p. 080015-1 to 080015-9, 1850, United States.

Erasmus, Stephanus J., Theodor W. Backstrom, Matti Lubkoll, and Frank Dinter, Design and development of a next generation thermal rock bed storage experimental facility, AIP Conference Proceedings, 2019, p. 200017-1 to 200017-9, 2126, United States.

Forsberg, Charles, Piyush Sabharwall, and Hans D. Gougar, Heat Storage Coupled to Generation IV Reactors for Variable Electricity from Base-load Reactors: Workshop Proceedings: Changing Markets, Technology, Nuclear-Renewables Integration and Synergisms with Solar Thermal Power Systems, Idaho National Laboratory, 2019, p. i-D3, INL/EXT-19-54909, Idaho Falls, Idaho, 338 pages.

Siemens Gamesa, Electric Thermal Energy Storage, 2020, https://www.siemensgamesa.com/en-int/products-and-services/hybrid-and-storage/thermal-energy-storage-with-etes, Hamburg, Germany, 2 pages.

* cited by examiner

RADIAL PARTICLE-BASED TERRESTRIAL THERMOCLINE FOR HIGH TEMPERATURE THERMAL STORAGE

STATEMENT REGARDING FEDERALLY SPONSORED RESEARCH OR DEVELOPMENT

This invention was developed under Contract No. DE-NA0003525 awarded by the U.S. Department of Energy/National Nuclear Security Administration. The Government has certain rights in this invention.

BACKGROUND OF THE INVENTION

The application generally relates to thermal energy storage systems. The application relates more specifically to a radial particle-based terrestrial thermocline for high temperature thermal energy storage.

Intermittent renewable energy sources such as wind and solar are increasing on the electrical power grid. Load fluctuations may cause excess power generation or shortages, and intermittent sources may be unable to meet peak loads after the sun sets or when wind speeds decrease. If the grid is to meet the time-shifting demands of renewable energy generation and peak loads there must be a means of providing energy storage. The cost and capacity of current energy storage batteries, e.g., lithium-ion technology, may be prohibitive for large-scale systems in metropolitan areas. These power systems strive for carbon-free energy production in the future, and expected requirements range from tens to hundreds of gigawatt-hours (GWh) to sustain both diurnal and multi-day storage needs. Seasonal conditions may require storage charges of weeks to months of energy saved during the summer months for use in the winter when renewable energy may not be as plentiful.

Thermal energy storage has been developed as an inexpensive method for providing large-scale energy capacity greater than 1 GWh for over 10 hours. Currently, large-capacity thermal-energy storage systems utilize molten salt in concentrating solar power systems. However, molten-salt systems suffer from freezing at relatively low temperatures, leakage, damaging stresses on storage vessels, and decomposition at temperatures above 600° C.

Rock-based thermocline storage systems have been suggested as a means to lower the costs of energy storage. A single tank holds a bed of rocks while a heat-transfer fluid, e.g., air, oil or molten salt, is passed through the bed to charge the system with heat. When energy is needed, thermal flow is reversed and the heat is discharged from the thermocline. More recently, a rock-bed thermocline storage systems using air as the heat transfer fluid has been disclosed. In these past thermocline systems, the heat-transfer fluid flows through a packed bed along an axial direction. In a cylindrical tank, the fluid flows along the vertical axis of the tank. Axial-flow thermoclines suffer from an unstable interface between the hot and cold fluids during charging and discharging. The temperature interface becomes diffuse due to instabilities, and the premature degradation of the discharging fluid temperature decreases the performance of the power generation or heat utilization system.

In contrast to axial-based thermocline storage systems, radial-based thermoclines have been disclosed as a less expensive and reliable alternative. Prior radial-based thermoclines disclose a surface-based system, wherein a hot air injection well is disposed in the middle of a rock pile to thermally charge the rock bed or discharge heat to provide thermal energy. The radial-based system suffers from buoyancy-induced flow and mixing within the rock pile, which degrades the temperatures and subsequent performance of the power generating or heat utilization systems.

The present invention seeks to overcome these past challenges associated with higher cost and reduced performance by utilizing a radial thermocline storage system with improved temperature and flow control in a bed of porous materials, having one or more layers or zones of different particle sizes, materials, and/or injection/extraction wells. This system may be terrestrial based to provide inexpensive energy storage with larger capacity suitable for intermittent renewable energy needs.

What is needed is a system and/or method that satisfies one or more of these needs or provides other advantageous features. Other features and advantages will be made apparent from the present specification. The teachings disclosed extend to those embodiments that fall within the scope of the claims, regardless of whether they accomplish one or more of the aforementioned needs.

SUMMARY OF THE INVENTION

One embodiment relates to a radial thermocline for storage of thermal energy. The thermocline includes a recess having a first storage layer comprising a first permeable filler material and a second storage layer comprising a second permeable filler material. An intermediate layer is disposed between the first storage layer and the second storage layer. A primary well is disposed in the thermocline vertically, the primary well traversing the first storage layer, the intermediate layer and the second storage layer. The primary well is in thermal communication with the first permeable filler material and the second permeable filler material. A heat source is provided for heating an inlet fluid. An input pump is in fluid communication with the primary well and the heat source. The primary well receives heated inlet fluid from the inlet pump and injects the fluid into the first and second storage layers. The heated inlet fluid transfers heat to the respective permeable filler material radially from the primary well toward the outer periphery of the recess.

Another embodiment relates to a radial thermocline for storage of thermal energy. The thermocline includes a recess with a storage layer formed of a permeable filler material. A primary well is inserted in the thermocline centrally in the storage layer. The primary well is in thermal communication with the permeable filler material. A heat source heats an inlet fluid. An input pump is in fluid communication with the primary well and the heat source. The primary well receives heated inlet fluid from the inlet pump and injects the heated inlet fluid into the storage layers. The heated inlet fluid transfers heat to the permeable filler material radially from the primary well toward the outer periphery of the recess.

Still another embodiment relates to a method for storing thermal energy in a thermocline. The method includes providing a cylindrical terrestrial recess with multiple horizontal layers; filling the layers with porous, thermally permeable material; inserting a vertical well traversing the multiple layers; injecting heated air from a heat source into the thermally permeable material; distributing the heated air radially from the vertical well toward the outer periphery of the cylindrical recess; generating variable temperature layers; and withdrawing the heated air selectively for powering an external load.

Certain advantages of the embodiments described herein include a radial thermocline with a primary vertical injection well that injects heat into one or more horizontal porous layers in a primarily radial direction for thermal energy storage and subsequently withdraws heat from the layers.

Another advantage is heat that is conveyed via ambient or recycled air.

Another advantage is the system is excavated in a terrestrial, subsurface pit or recess, or adapted from an existing mine or pit.

A further advantage is the use of auxiliary wells to inject or withdraw heat at a lower temperature than the primary well.

Yet another advantage is the injected heat may be deployed for regenerating cooler portions of the storage system.

Another advantage is that the heat being withdrawn may be used to preheat the injected heat from the primary well or one or more of the auxiliary wells.

Another advantage is that the heat source can be from electricity, e.g., low demand, concentrating solar power, or waste heat An additional advantage is a low-permeability, top insulated layer to mitigate water infiltration, air flow and heat loss through the top surface.

Also, multiple layers or zones of the system may be maintained at different temperatures and utilized for different temperature applications.

Further, particle or rock sizes may be varied to optimize performance by minimizing buoyancy and maximizing permeability in a desired region. Low-permeability layers may be used to separate and isolate strata or layers. Particle size may vary in vertical layers and radially, such as coarser particles adjacent the well for increased permeability, allowing higher flow velocity with lower pressure drop.

Another advantage is retractable well liners or sleeves to control inlet and outward flow in selected layers.

Alternative exemplary embodiments relate to other features and combinations of features as may be generally recited in the claims.

BRIEF DESCRIPTION OF THE DRAWINGS

The application will become more fully understood from the following detailed description, taken in conjunction with the accompanying figures, wherein like reference numerals refer to like elements, in which.

DETAILED DESCRIPTION OF THE INVENTION

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

Figure 1:
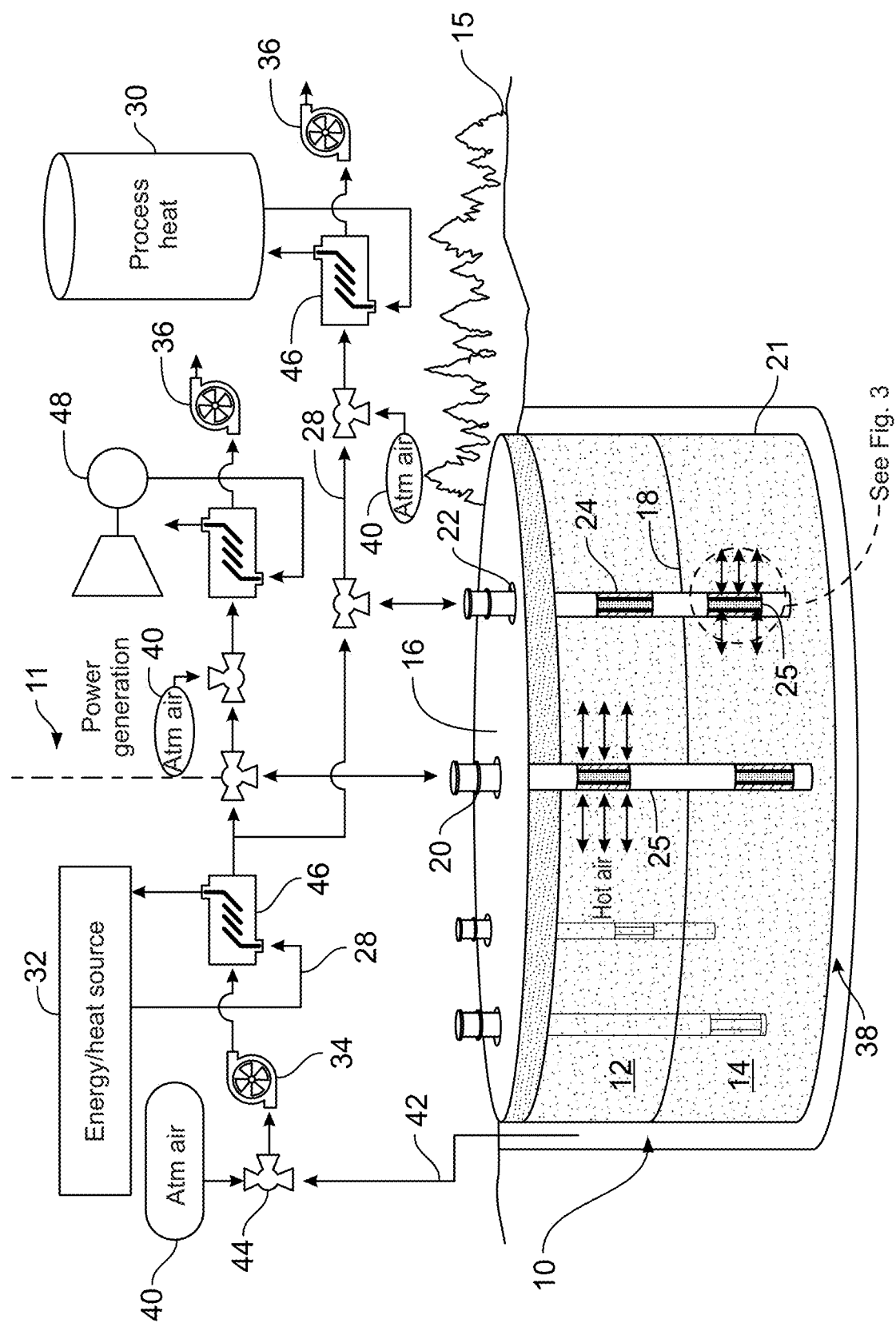
FIG. 1 shows an exemplary embodiment of a system diagram of the radial thermocline.

Referring to FIG. 1, a generally cylindrical thermocline 10 includes an upper layer 12 and a lower layer 14. An intermediate layer 18 is disposed between upper layer 12 and lower layer 14. A cap layer 16 of low-permeability material may be installed on top of the storage bed to mitigate buoyancy effects, heat loss through the top, and water infiltration. Cap layer 16 may be comprised of clay, rock, sintered bauxite, recycled glass, firebrick, pearlite, sand, or other suitable material that can withstand high-temperature applications. Low permeability material minimizes water infiltration and convective heat loss through the top. Cap layer may preferably be comprised of particle-and rock-based materials having a relatively low thermal conductivity as a natural insulation. The cap layer may also comprise a sloped fine layer over a coarse layer to create a capillary barrier to prevent water intrusion from rain into the lower layers. The radial configuration of thermocline 10 provides lower temperature levels at the periphery and minimizes radial heat losses to the surroundings. In an embodiment thermocline 10 may be very large and designed so the temperatures at the periphery are about 50° C. to 100° C. above ambient, or less. Preferably, thermocline 10 is a terrestrial-based recess or containment unit that is constructed subsurface with respect to the ground.

Figure 2:
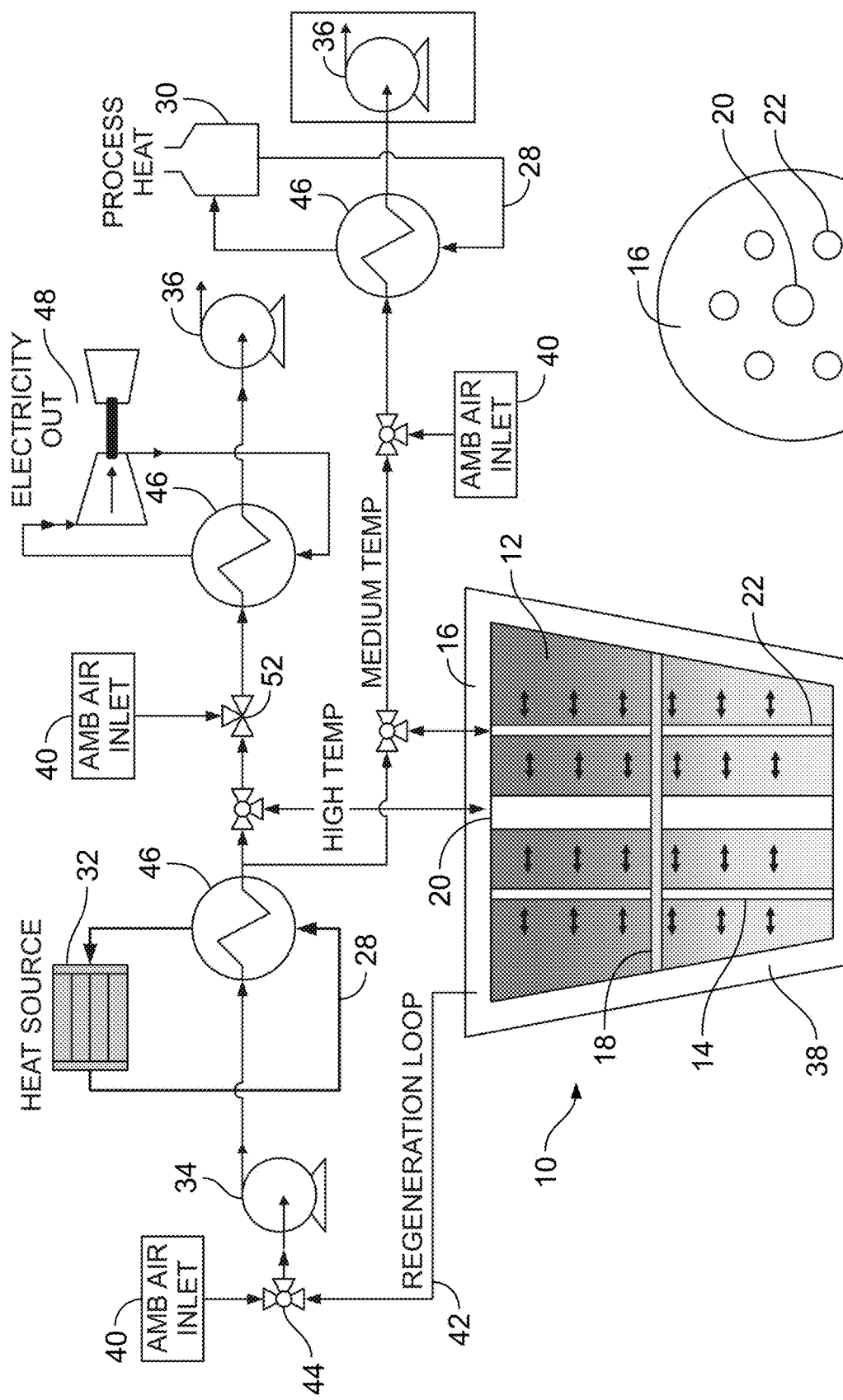
FIG. 2A shows a schematic heat flow diagram of the thermocline of FIG. 1
FIG. 2B top view of the thermocline.

A primary well 20 is inserted into thermocline 10 at or near the center vertical axis 11. An auxiliary well 22 may be inserted off-center in thermocline 10 and towards peripheral surface 21 for trickle charging upper layer 12 or lower layer 14, or for low-temperature energy discharge. A charging sleeve 24 provides adjustable flow of heated air or fluid into and from layers 12, 14. Alternately wells 20, 22 may include perforations in the wall of the well at predetermined fixed positions. An annulus containment layer 38 is provided around the cylindrical storage layers 12, 14. An optional heat recovery system may be used to return warm fluid exiting the heat exchanger 46 for the process heat system 30. FIG. 2B shows a top view of thermocline 10 in an exemplary arrangement of auxiliary wells 22 distributed in a radial pattern around primary well 20.

Heated air or fluid is introduced into thermocline 10 from a heat source 32. Heat source 32 may be, for example, an electrical heater, solar power generator, or waste heat. For purposes of this disclosure, fluid is defined to mean air and any other fluids. Heated fluid is injected by a pump 34 through primary well 20 and into porous layers 12, 14. In an alternate embodiment additional layers may be added to layers 12, 14. Layers may be comprised of gravel, rock, sand, sintered bauxite, or other porous materials. Various type and size of material may be selected to optimize the permeability and flow of heat through layers 12, 14, while at the same time minimizing buoyancy. Multiple layers may be provided to maintain suitable temperatures for different applications, for example power generation systems 48 or process heating 30. One or more auxiliary wells 22 may be distributed adjacent or around primary well 20, e.g., in a radial or circumferential pattern. Auxiliary well 22 may inject supplemental energy from heat source 32 into cooler regions of the thermocline 10. The arrangement of wells 22 can be optimized for injection and withdrawal of energy flows. In an alternate embodiment thermocline 10 may have a conical configuration open towards the surface 15. In alternate embodiments, thermocline 10 may be configured in a frusto-conical cross-sectional shape (FIG. 2A).

Energy may be extracted via pump 36 from the primary well 20 and transferred to a load, e.g., a power-generating unit 48 or a process heating system 30. Auxiliary wells 22 may draw lower temperature fluid from, e.g., lower layer 14, for use in lower-temperature applications such as process heating 30. Primary well 20 and auxiliary wells 22 may be fitted with retractable liners or charging sleeves 24 to selectively direct fluid flowing into and from prescribed layers 12, 14 for controlled heating and temperatures. Ambient air 40 can be introduced to primary well 20 and auxiliary wells 22 via mixing valve 44 and blended with heated fluid 42 withdrawn from the periphery of layers 12, 14. Ambient air 40 injected into heated fluid at valve 52 regulates and maintains a controlled temperature for input to power-generating unit 48 or process-heat unit 30.

Low-permeability layer 16 may be disposed between layers 12 and 14, and any additional layers, to mitigate the effect of inter-layer buoyancy and to maintain uniform, predetermined, or desired, temperatures in each respective layer. Intermediate layers 16 may be constructed of the same material as cap layer 16.

An annular containment layer 38 may be provided surrounding thermocline 10. Containment layer 38 may be filled with gravel, refractory material, sintered bauxite, sand, rocks, boulders, or lined with mesh/screen to enable the radial flow of fluid from the center to the periphery. Auxiliary wells 22 may be placed in annulus containment layer 38.

Figure 3:
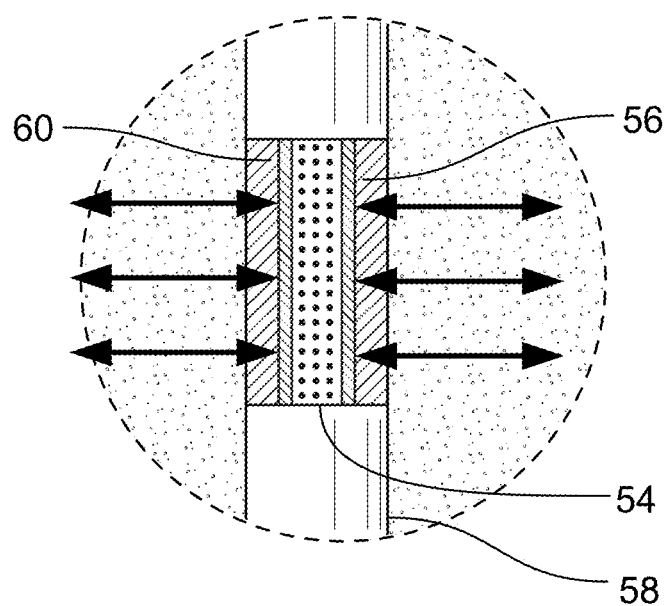
FIG. 3 shows an exemplary embodiment of a charging sleeve.

Referring next to FIG. 2A, a schematic flow diagram of the thermocline 10 of FIG. 1 is shown. Pump 34 draws ambient air 40 and, optionally, heated regenerated fluid 42 through inlet valve 44. Heat source 32 provides energy to a heat exchanger 46 to heat the mixture of inlet fluid 40 and regeneration fluid 42. Heat extraction pumps 36 draw fluid from the primary well 20 for delivery to the power-generating unit 48 or process-heat unit 30. Auxiliary wells 22 may be used to draw lower temperature fluid for process heating applications at reduced temperatures. Primary well 20 and auxiliary wells 22 may include retractable liners or charging sleeves 24 to direct the flow of fluid to and from prescribed layers for controlled heating and temperatures (FIG. 3). If air is used as the heat-transfer fluid, ambient air can be blended with the hot withdrawn fluid using valves 52 and pumps 36 to regulate and maintain the temperature for use in the power-generating unit 48 or process-heat unit 30. This allows for higher-temperature energy to be stored, reducing the required size of the storage for the same amount of energy capacity. Annulus containment layer 38 disposed around thermocline layers 12, 14, can be filled with gravel, refractory material, sintered bauxite, sand, rocks, boulders, or lined with mesh/screen to enable the radial flow of fluid from the center to the periphery. Auxiliary wells 22 may optionally be inserted in annulus containment layer 38.

Referring next to FIG. 3, in an exemplary embodiment sleeve 24 may be a circulation and production sleeve comprising a full opening device 54. Device 54 has an inner sleeve 56 that can be opened and closed to gain fluid communication between well tubing 58 and casing annulus 60. Device 54 may include a nipple profile in the top sub and a polished bore in the bottom for accessory tools such as a side-door choke or separation tool to be set across device 54. One exemplary device 54 may be a DuraSleeve® Sliding Side Door Sleeve manufactured by Halliburton Corporation of Houston, Tex.

Figure 4:
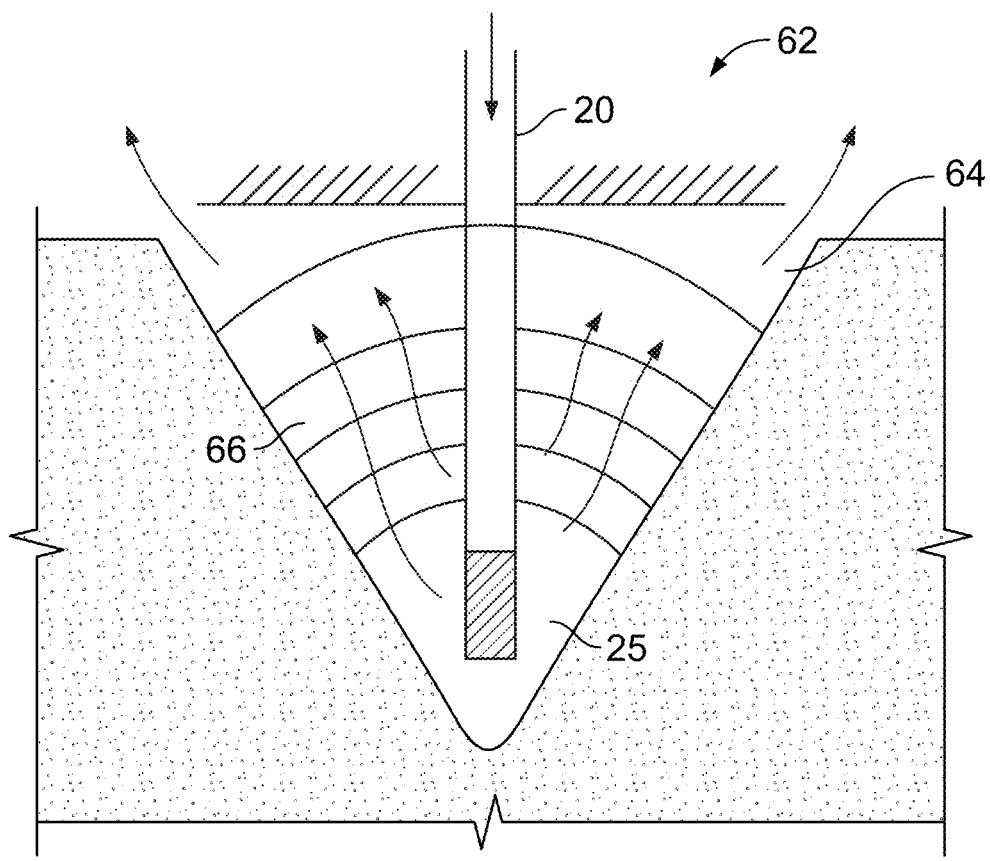
FIG. 4 shows an alternate embodiment having a conical thermocline configuration.

Referring next to FIG. 4, in an alternate embodiment a radial conical thermocline 62 is shown. The conical shape may be used instead of a cylindrical shape for distributing heat through layers 64, 66. Intermediate layers 63 may be disposed between upper layer 64 and one or more lower layers 66.

In an embodiment, the storage bed or thermocline 10 may be used as cold storage to provide cooling for the power block. Radiative cooling can be transferred through the large top surface 16 at night. High-emissivity material or solar-selective material in the top surface 15 may provide radiative cooling at night but low solar absorption during the day. Storage layers may be configured for pumped thermal storage, with multiple pits for different high/low temperature reservoirs, using additional heat exchangers.

Using high-permeability gravel or rocks near the primary well 20 will increase flow in this high-velocity region. Sand or lower permeability material in between the storage layers 12 and 14 will reduce natural convection. Since the radial velocity is reduced as radial distance increases, the pressure drop from this lower permeability material will be reduced.

Combining varying sized particles and rocks may yield benefits in different regions. The radial thermocline configuration is suitable for varied temperature zones for different heating applications. The core center region will provide the maximum temperature, which can be used for power generation and other high-temperature applications.

While the exemplary embodiments illustrated in the figures and described herein are presently preferred, it should be understood that these embodiments are offered by way of example only. Accordingly, the present application is not limited to a particular embodiment but extends to various modifications that nevertheless fall within the scope of the appended claims. The order or sequence of any processes or method steps may be varied or re-sequenced according to alternative embodiments.

It is important to note that the construction and arrangement of the radial thermocline as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

It should be noted that although the figures herein may show a specific order of method steps, it is understood that the order of these steps may differ from what is depicted. Also, two or more steps may be performed concurrently or with partial concurrence. Such variation will depend on the systems chosen and on designer choice. It is understood that all such variations are within the scope of the application. Likewise, software implementations could be accomplished with standard programming techniques with rule-based logic and other logic to accomplish the various connection steps, processing steps, comparison steps and decision steps.

The invention claimed is:

1. A radial thermocline for storage of thermal energy, the thermocline comprising:
   a thermocline recess having a first storage layer comprising a first permeable filler material having a first permeability and a first thermal conductivity, a second storage layer comprising a second permeable filler material having a second permeability and a second thermal conductivity, and an engineered intermediate layer disposed between the first storage layer and the second storage layer; a primary well inserted into thermocline vertically traversing the first storage layer, the intermediate layer and the second storage layer; the primary well being disposed in thermal communication with the first permeable filler material and the second permeable filler material;
   a heat source for heating an inlet fluid; and
   an input pump in fluid communication with the primary well and the heat source; the primary well configured to receive heated inlet fluid from the inlet pump and inject the heated inlet fluid into at least one of the first storage layer and the second storage layer; the heated inlet fluid transferring heat to the respective permeable filler material radially from the primary well toward an outer periphery of the thermocline recess;
   wherein the engineered intermediate layer comprises an intermediate layer material comprising a material different than the first and second permeable filler materials and having a permeability less than the first permeability and the second permeability.

2. The radial thermocline of claim 1, further comprising:
   an outlet pump in fluid connectivity to the primary well; and
   a thermal load in fluid connectivity with the outlet pump.

3. The radial thermocline of claim 2, further comprising a heat recovery blower in fluid communication with the input fluid pump to mix the heated inlet fluid with warm air rejected from the thermal load or the outer periphery of the radial thermocline recess.

4. The radial thermocline of claim 1, further comprising a cap layer disposed on the first storage layer, the cap layer comprising a cap layer material having a cap layer material permeability less than the first permeability or a capillary barrier comprising a capillary barrier material having a thermal-conductivity material that reduces buoyancy and heat loss from the radial thermocline.

5. The radial thermocline of claim 4, wherein the cap layer further comprises at least one of clay, rock, sintered bauxite, recycled glass, firebrick, pearlite or sand.

6. The radial thermocline of claim 1, wherein the thermocline comprises a terrestrial recess that is disposed below a ground surface.

7. The radial thermocline of claim 1, wherein the primary well is disposed along a central vertical axis of the thermocline.

8. The radial thermocline of claim 1, further comprising at least one auxiliary well, the at least one auxiliary well inserted vertically within the thermocline and traversing the first storage layer and the second storage layer; the at least one auxiliary well configured to provide trickle charging of the first storage layer or the second storage layer.

9. The radial thermocline of claim 8, wherein the at least one auxiliary well comprises a plurality of auxiliary wells, and wherein the auxiliary wells being distributed radially around the primary well.

10. The radial thermocline of claim 1, wherein the first storage layer comprises a first fluid and the second storage layer comprises a second fluid.

11. The radial thermocline of claim 1, further comprising a charging sleeve, the charging sleeve rotatably adjustable for adjusting the flow of heat into and from the first storage layer and the second storage layer.

12. The radial thermocline of claim 1, wherein the engineered intermediate layer material has a permeability less than the first permeability and a thermal conductivity less than the first conductivity of the first permeable filler material.

13. The radial thermocline of claim 1, wherein one or more additional storage layers is disposed below the second storage layer, each of the storage layers being separated from adjacent storage layers by an intermediate layer.

14. The radial thermocline of claim 1, wherein the permeable filler material comprises one of gravel, rock, sand or sintered bauxite.

15. The radial thermocline of claim 1, wherein the thermocline recess has one of a cylindrical shape, a frusto-conical shape, or a conical shape.

16. The radial thermocline of claim 1, further comprising a charging sleeve inserted in at least one of the primary well or auxiliary wells in fluid communication with at least one of the first storage layer and the second storage layer, the charging sleeve rotatable to selectively expose flow apertures for adjusting flow of heat into and from the respective layer.

17. A radial thermocline for storage of thermal energy, the thermocline comprising:
   a recess having a storage layer comprising a permeable filler material; a primary well inserted into thermocline centrally in the storage layer; the primary well being disposed in thermal communication with the permeable filler material;
   a heat source for heating an inlet fluid; and
   an input pump in fluid communication with the primary well and the heat source; the primary well configured to receive heated inlet fluid from the inlet pump and inject the heated inlet fluid into the storage layer; the heated inlet fluid transferring heat to the permeable filler material radially from the primary well to an outer periphery of the thermocline recess;
   wherein the permeable fill material comprises a first permeable filler material having a first permeability and a first thermal conductivity, a second storage layer comprising a second permeable filler material having a second permeability and a second thermal conductivity, and an engineered intermediate layer disposed between the first storage layer and the second storage layer; and
   wherein the engineered intermediate layer comprises an intermediate layer material comprising a material different than the first and second permeable filler material and having a permeability less than the first permeability and the second permeability.

18. The radial thermocline of claim 17, further comprising an auxiliary well disposed between the primary well and a peripheral wall of the first and second storage layers.

19. The radial thermocline of claim 17, further comprising a charging sleeve, the charging sleeve rotatably adjustable for adjusting the flow of heat into and from the storage layer.

* * * * *